United States Patent [19]
Dieterich et al.

[11] Patent Number: 6,086,122
[45] Date of Patent: *Jul. 11, 2000

[54] CONNECTION OF A FRAME OF A GRILLE FOR SPECIAL VEHICLES SUCH AS ARMORED VEHICLES WITH PROFILED PANELS OF THE GRILLE

[75] Inventors: Günter Dieterich, Dortmund; Dipl.-Ing. Karlheinz Piel, Schwerte; Hans-Werner Schulte, Schwerte; Michael Schulz, Schwerte, all of Germany

[73] Assignee: Fried. Krupp AG Hoesch-Krupp, Dortmund, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,670

[22] Filed: Aug. 21, 1997

[30] Foreign Application Priority Data

Aug. 23, 1996 [DE] Germany .......................... 196 34 227

[51] Int. Cl.⁷ ............................... B60R 19/52; F41H 7/04
[52] U.S. Cl. ............................................. 293/115; 180/68.6
[58] Field of Search ......................... 296/180.1; 293/115; 180/68.6; 52/473

[56] References Cited

U.S. PATENT DOCUMENTS

| | | | |
|---|---|---|---|
| 2,165,648 | 7/1939 | Oswald | 52/473 |
| 5,332,054 | 7/1994 | Dietrich et al. | 293/115 |
| 5,641,933 | 6/1997 | Kim | 89/36.02 |

FOREIGN PATENT DOCUMENTS

| | | | |
|---|---|---|---|
| 551332 | 10/1956 | Belgium | 52/473 |
| 1104997 | 11/1955 | France | 52/473 |
| 91154 | 1/1958 | Norway | 52/473 |

*Primary Examiner*—D. Glenn Dayoan
*Assistant Examiner*—Paul Chenevert
*Attorney, Agent, or Firm*—Max Fogiel

[57] ABSTRACT

An attachment between the frame of a grating in a special-purpose vehicle, an armored vehicle for example, and the lengths of structural section that comprise the grating. The ends of the lengths of structural section are secured against displacement by a plate. When the lengths of structural section have a metal core and a non-metal sheath, the core or part of the core is attached to and can or cannot be detached from the frame by way of the plate. The plate is positioned against the surface of the frame component that faces away from the lengths and is provided with cutouts (6) that provide access to the core of each length and allow the introduction of means (5 or 8) of attachment.

6 Claims, 8 Drawing Sheets

CONNECTION OF A FRAME OF A GRILLE FOR SPECIAL VEHICLES SUCH AS ARMORED VEHICLES WITH PROFILED PANELS OF THE GRILLE

BACKGROUND OF THE INVENTION

Special-purpose vehicles, armored vehicles for example, are employed off-road. Their engine compartments and cooling systems are encapsulated to prevent the vehicles from breaking down due to damage to these components of the vehicle's drive assembly by the penetration of foreign bodies. Both combustion air and engine-cooling air are generally supplied through gratings. The engine compartment generally has two such gratings, one for the incoming and one for the outgoing air. A fan in the vicinity of the incoming-air grating fetches in as much air as is needed, and the used air is allowed to escape on its own through the other grating.

Such gratings are expected to be open enough overall to allow all the requisite air through, whereas their individual interstices must be small enough to keep the foreign bodies out.

The known gratings, the one disclosed in German OS 3 703 716 for example, are composed of parallel lengths of structural steel secured in a frame, their ends welded to the facing areas of its inner surface. The welds are in the way of the incoming air and exposed to the impact of the foreign bodies.

The joints between the section and the frame are affected by the heat of welding and are not as resistant to impact as the original material. Furthermore, it is impossible to weld the section to the frame satisfactorily enough.

The ends of the lengths of structural section in the grating generic to the present invention, disclosed in German 4 028 124 A1, are accordingly designed to fit into matching cutouts in the components of the frame, and can either be removed or not removed from its inner surface. The lengths in one particular embodiment of the generic grating fit into such cutouts, and each is secured against displacement by a frame positioned against the surface of the frame that faces away from the lengths.

There is, however, a drawback to this method of attachment in that even slight deviations in tolerance will allow the lengths to move around in the cutouts.

Lengths of structural grating section like those disclosed in Europe Patent 0 732 234 A2 have recently been developed composed of a combination of materials, a core of metal sheathed in a non-metal, e.g aramide, glass-fiber reinforced plastic, or a similar material.

SUMMARY OF THE INVENTION

The object of the present invention is an improvement in the generic attachment between a frame and a grating wherein lengths of structural section with a metal core and a non-metal sheath can be simply and reliably secured in a frame.

The particular advantage of the attachment in accordance with the present invention is that lengths of structural section with a metal core and a non-metal sheath can be simply secured to the upright components of the grating's frame with no need to machine the ends of the lengths to ensure their fit.

BRIEF DESCRIPTION OF THE DRAWINGS

Embodiments of the attachment in accordance with the present invention will now be specified with reference to the accompanying schematic drawing, wherein.

DESCRIPTION OF THE PREFERRED EMBODIMENTS

The length of structural section intended for a frame and illustrated in FIGS. 1 through 9 comprises a steel core 1 and a non-metal sheath 2. The lengths are secured to a frame component 3 by way of a displacement-prevention plate 4. As will be evident from FIGS. 4, 5, 8, and 9, plate 4 is positioned securely against the surface of frame component 3 that faces away from the lengths.

Figure 2:
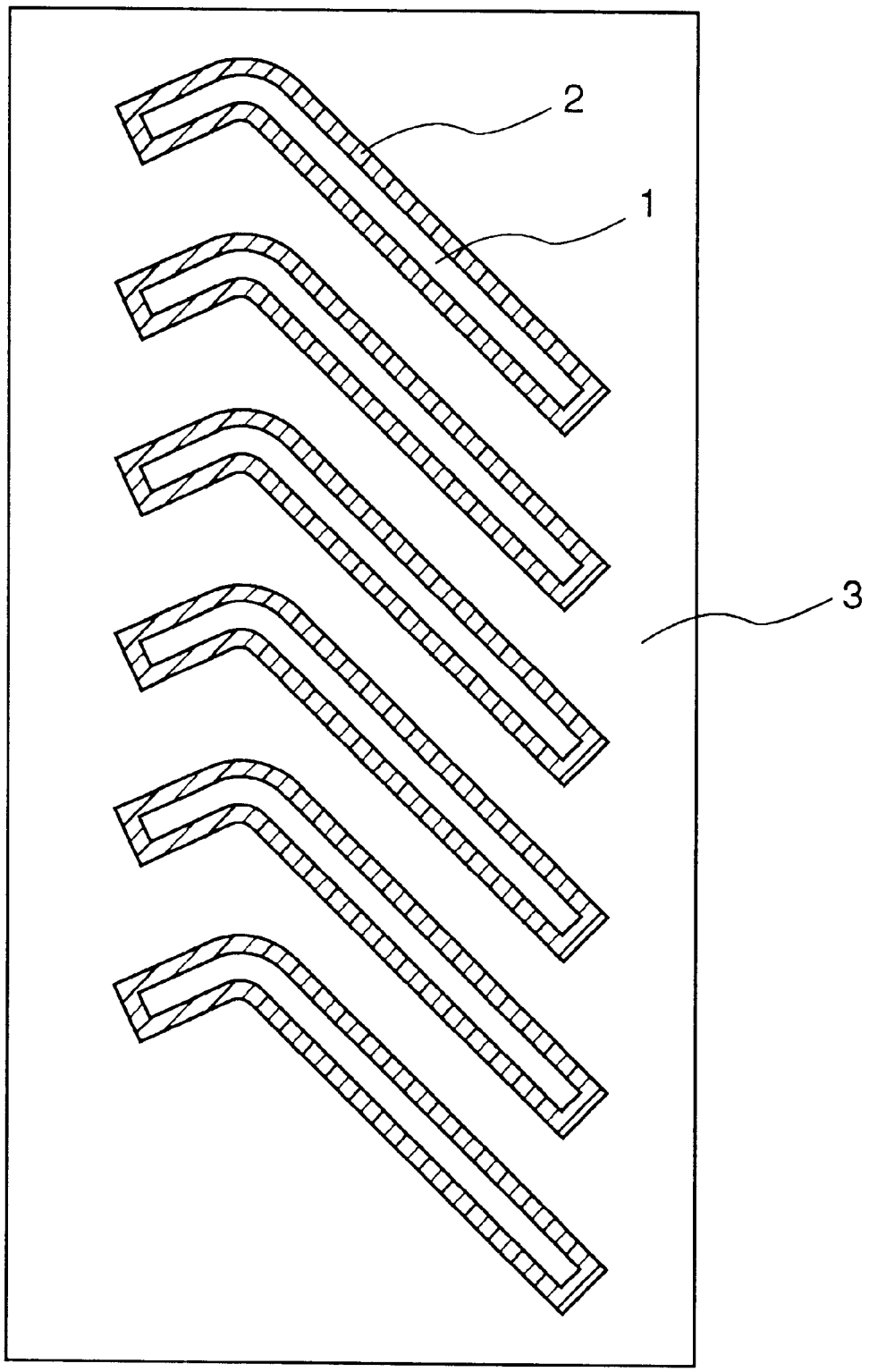
FIG. 2 is a side view of a frame component with the lengths of structural section viewed head-on, FIG. 3 is a side view of a displacement-prevention plate.

As will be evident from FIG. 2, the lengths of structural section, each comprising a core 1 and a sheath 2, are inserted in matching cutouts in frame component 3. As will be evident from FIG. 3, the displacement-prevention plate also has cutouts 6 that essentially match the cross-section of each core 1.

Figure 1:
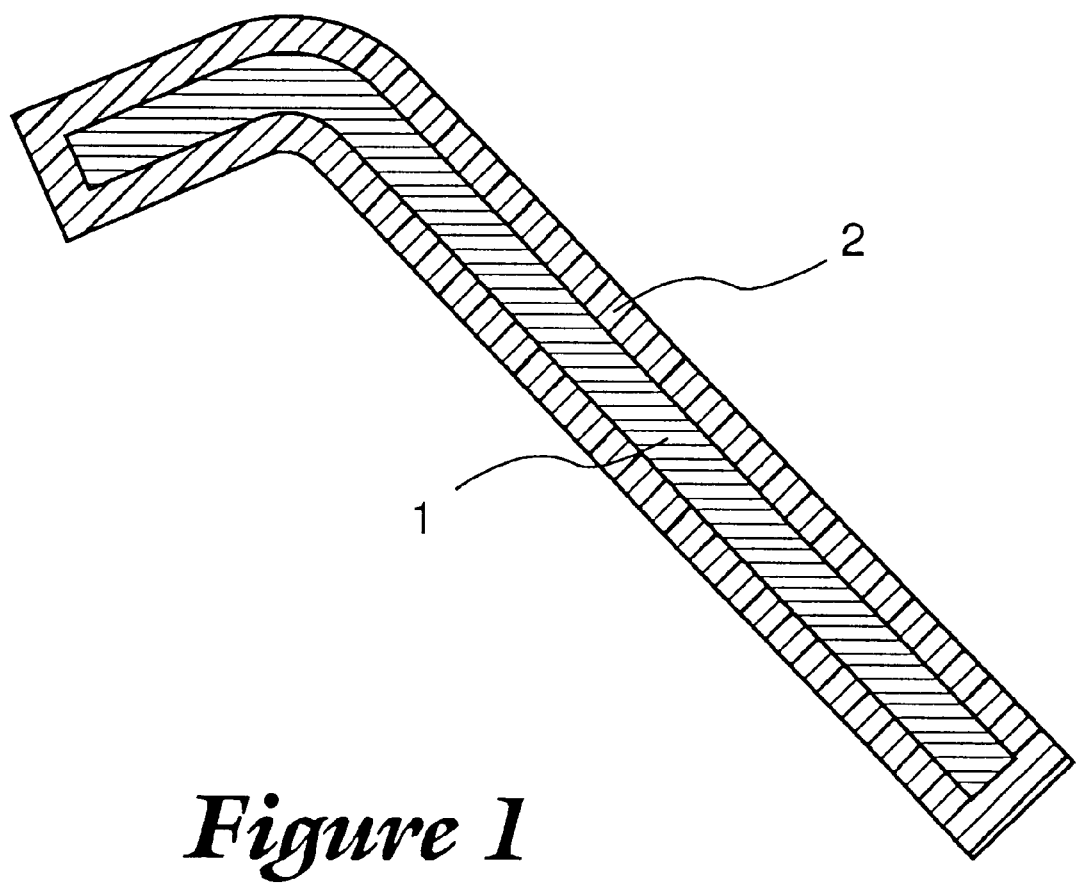
FIG. 1 is a head-on view of a length of structural section.
Figure 3:
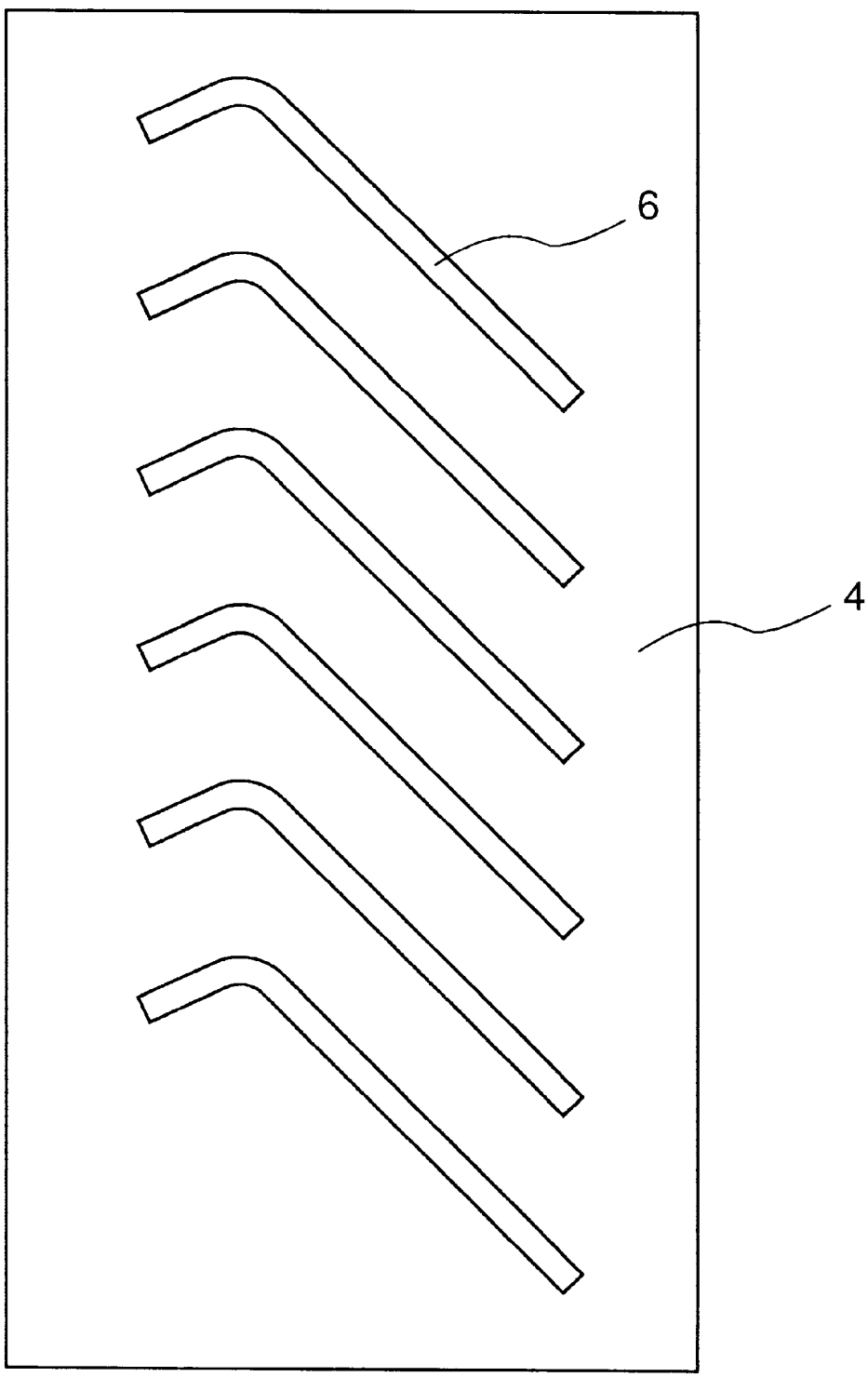
Figure 4:
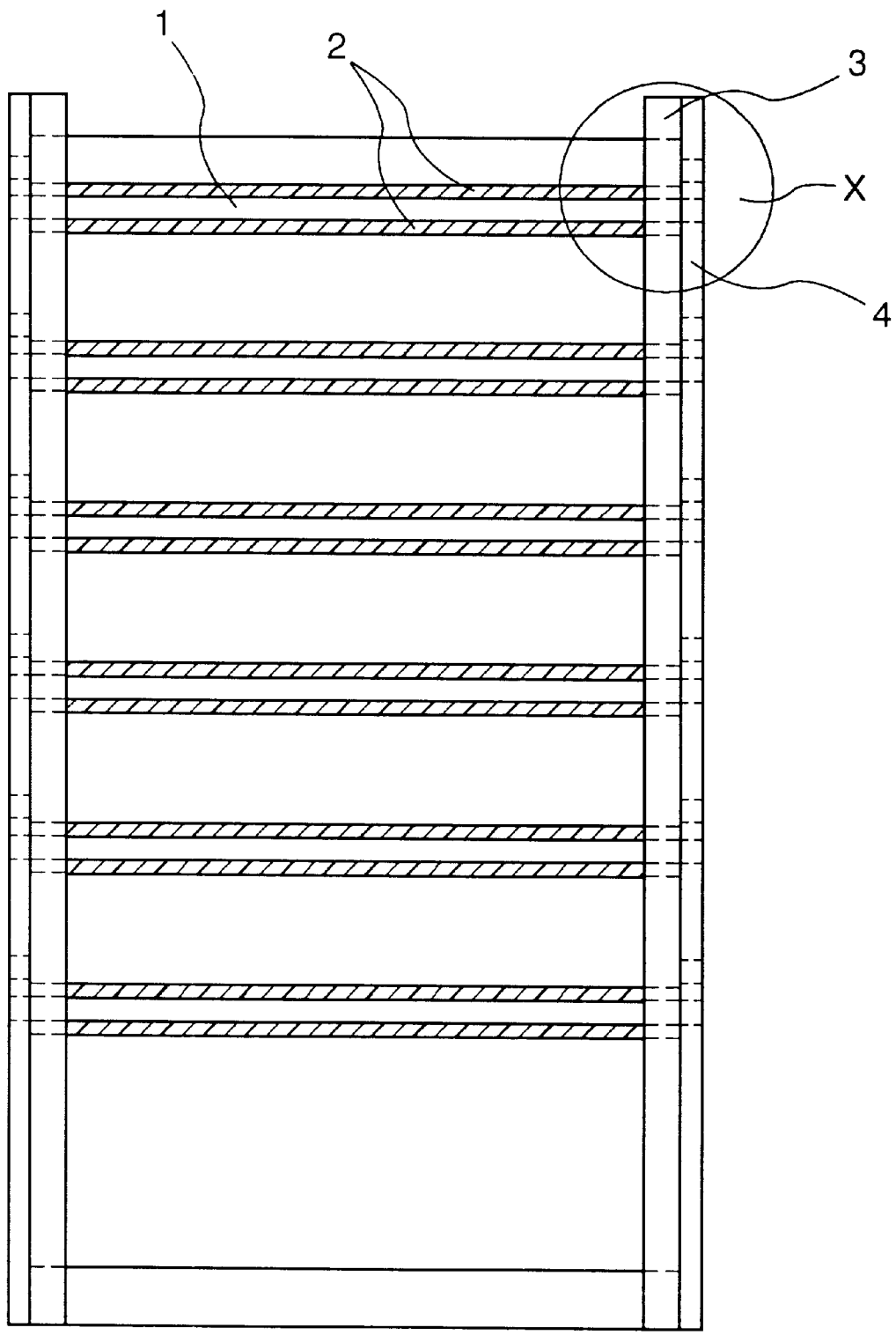
FIG. 4 is a front view of one embodiment of a grating.
Figure 5:
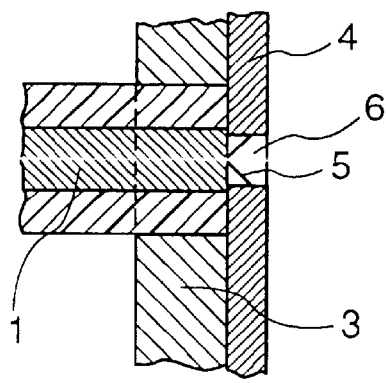
FIG. 5 is a detail of the area X in FIG. 4.

The lengths of structural section illustrated in FIGS. 1 and 2 are secured to the frame components 3 of the grating embodiment illustrated in FIGS. 4 and 5 by a plate 4 with the cutouts 6 illustrated in FIG. 3 and cannot be removed therefrom because core 1 is welded into cutouts 6 at a seam 5.

Figure 6:
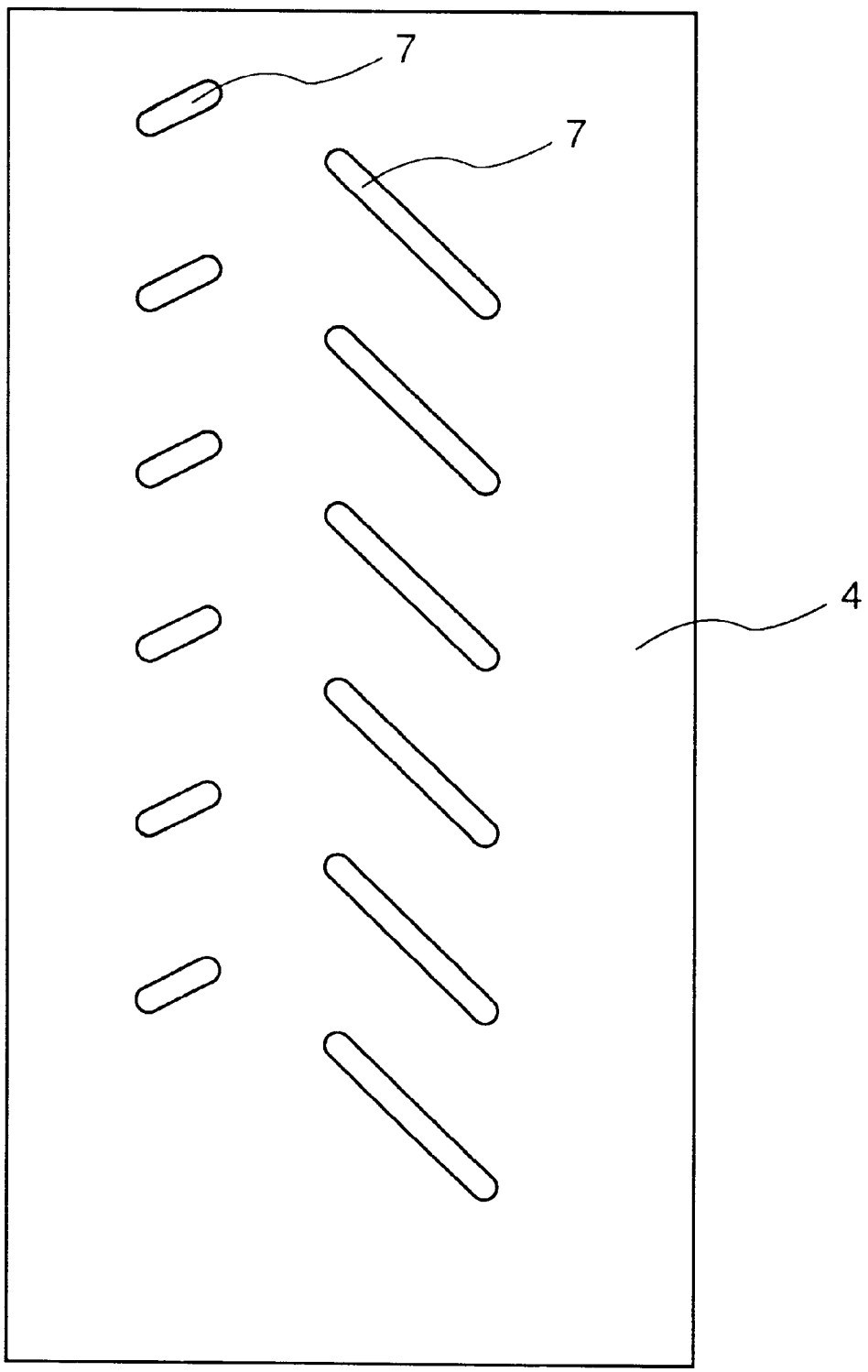
FIG. 6 is a front view on another embodiment of a displacement-prevention plate.

A similar permanent attachment can be achieved with the displacement-prevention plate 4 illustrated in FIG. 6. The cutouts in this plate are represented by pairs of slots 7 that accommodate the unillustrated core. The lengths employed in this embodiment need not be completely welded in place.

Figure 9:
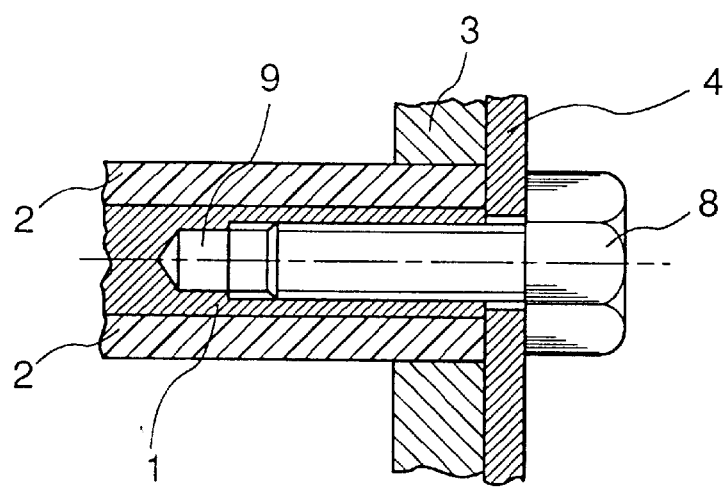
Figure 7:
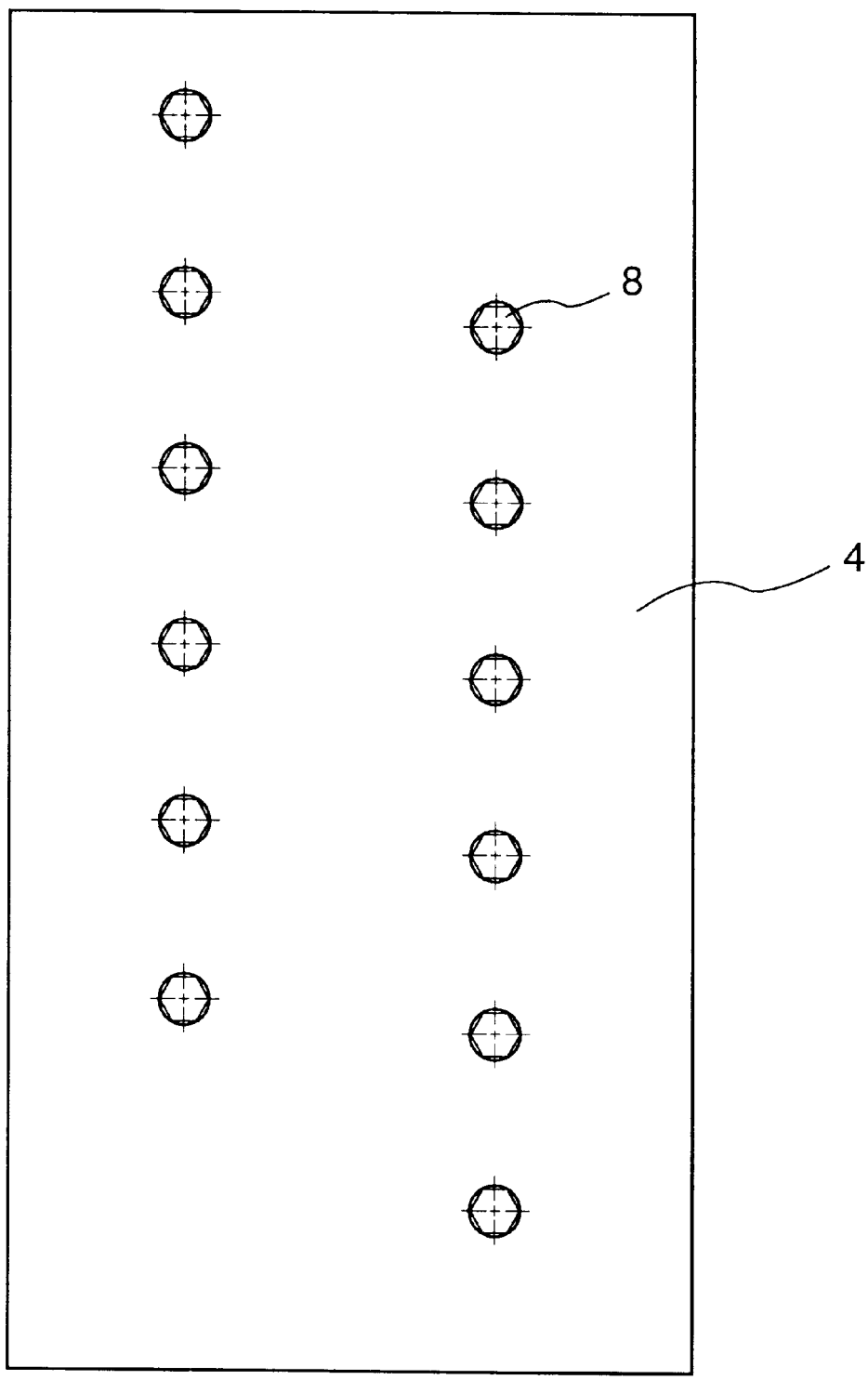
FIG. 7 is a front view of still another embodiment of the displacement-prevention plate.
Figure 8:
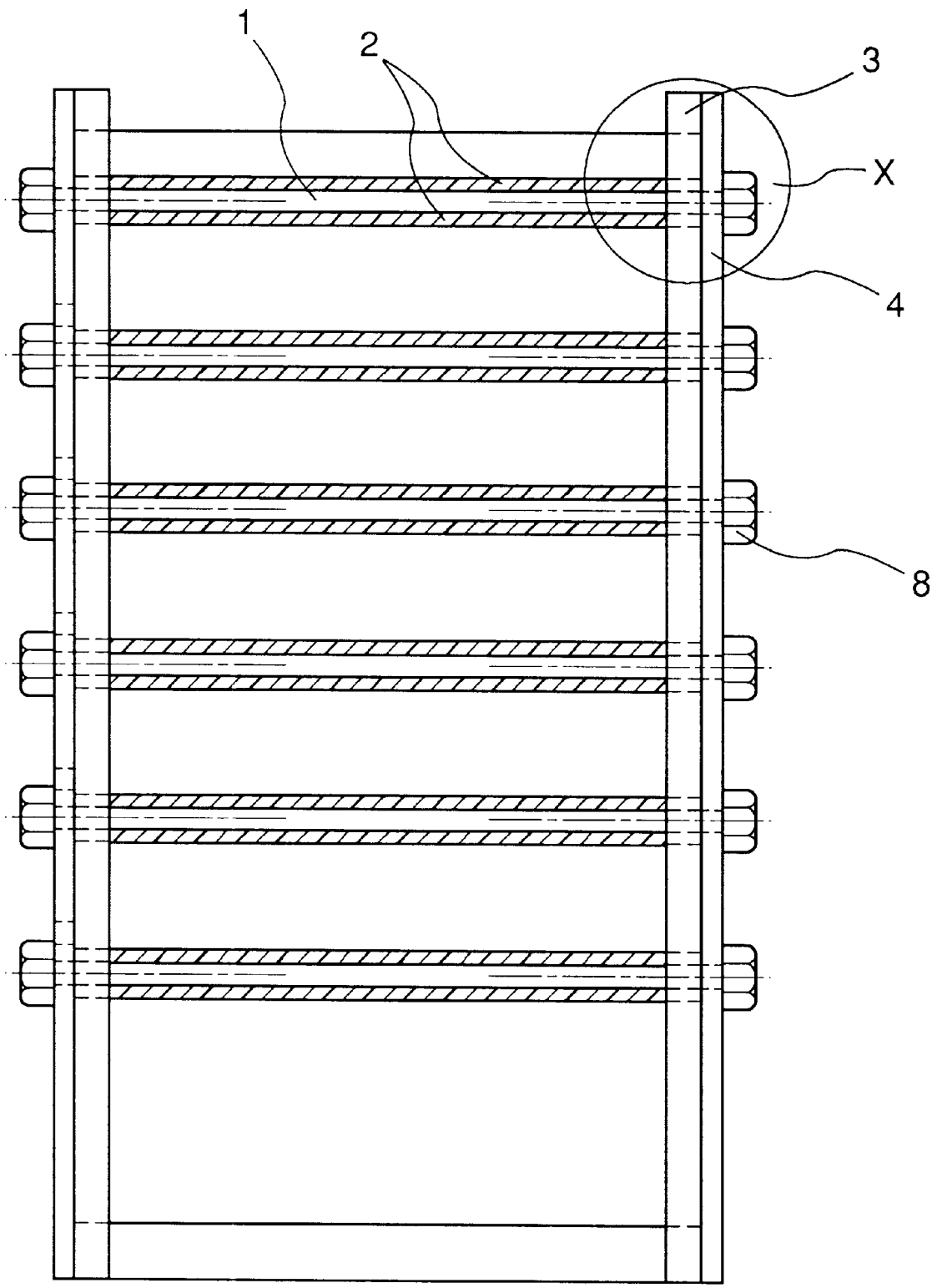
FIG. 8 is a front view of a grating with a displacement-prevention plate like that illustrate in FIG. 7, and FIG. 9 s a detail of the area X in FIG. 8.

FIGS. 7 through 9 illustrate a displacement-prevention plate 4 with cutouts in the form of round perforations that accommodate screws 8. Screws 8 screw into threaded bores 9 in the ends of the lengths of structural section. The lengths employed in this embodiment can be detached from frame components 3.

The plate 4 illustrated in FIG. 6 will also allow the lengths of structural section to be detached from frame component 3 if the attachment comprises screws that extend through slots 7 and screw into threaded bores in cores 1.

The displacement-prevention plate 4 in each of the embodiments specified herein can additionally be welded to frame component 3. Such an approach, however, is unnecessary because the plate will be held in place securely enough by the already existing attachment between the cores and the frame component.

What is claimed is:

1. A grating for special-purpose vehicles, comprising: a plurality of parallel lengths of structural section having ends; frame components at said ends and having first cutouts, said ends of said lengths of structural section extending through said first cutouts; said lengths of structural section having a metal core and a non-metal sheath; a plate with second cutouts corresponding in cross-section to said metal core and positioned against a surface of said frame components, said core at said ends facing said second cutouts, said first cutouts corresponding in cross-section to said ends of said lengths of structural section; means securing said at least part of said core at said ends in said second cutouts in said plate for securing said ends of said lengths of structural section against displacement within said first cutouts when said second cutouts are in substantial alignment with said first cutouts and said plate is free of displacement relative to said frame components for securing said ends of said lengths of structural section.

2. A grating as defined in claim 1, wherein said second cutouts in said plate are elongated holes through which said core is connected to said plate.

3. A grating as defined in claim 1, wherein said plate has at least two second cutouts for each core.

4. A grating as defined in claim 1, wherein said core is non-releasably welded in said second cutouts to said plate.

5. A grating for special-purpose vehicles, comprising: a plurality of parallel lengths of structural section having ends; frame components at said ends and having first cutouts, said ends of said lengths of structural section extending through said first cutouts; said lengths of structural section having a metal core and a non-metal sheath; a plate with second cutouts corresponding in cross-section to said metal core and positioned against a surface of said frame components, said core at said ends facing second cutouts, said first cutouts corresponding in cross-section to said ends of said lengths of structural section; means securing said at least part of said core at said ends in said second cutouts in said plate for securing said ends of said lengths of structural section against displacement within said first cutouts when said second cutouts are in substantial alignment with said first cutouts and said plate is free of displacement relative to said frame components for securing said ends of said lengths of structural section; said cutouts in said plate being elongated holes through which said core is connected to said plate; said plate having at least two cutouts for each core; said cutouts in said plate corresponding substantially to the cross-section of the respective core; said core being non-releasably welded in said cutouts to said plate.

6. A grating for special-purpose vehicles, comprising: a plurality of parallel lengths of structural section having frame components at said ends and having first cutouts, said ends of said lengths of structural section extending through said first cutouts; said lengths of structural section having a metal core and a non-metal sheath; a plate with second cutouts corresponding in cross-section to said metal core and positioned against a surface of said frame components, said core at said ends facing said second cutouts, said first cutouts corresponding in cross-section to said ends of said lengths of structural section; means securing said at least part of said core at said ends in said second cutouts in said plate for securing said ends of said lengths of structural section against displacement within said first cutouts when said second cutouts are in substantial alignment with said first cutouts and said plate is free of displacement relative to said frame components for securing said ends of said lengths of structural section; said cutouts in said plate being elongated holes through which said core is connected to said plate; said plate having at least two cutouts for each core; said cutouts in said plate corresponding substantially to the cross-section of the respective core; said core being releasably screwed to said plate by screws.

* * * * *